Sept. 23, 1969    SHINOBU FUJIWARA    3,468,680
CERAMIC DIELECTRICS
Filed Nov. 6, 1967

INVENTOR
SHINOBU FUJIWARA

BY Wenderoth, Lind & Ponack
ATTORNEYS

United States Patent Office 3,468,680
Patented Sept. 23, 1969

3,468,680
CERAMIC DIELECTRICS
Shinobu Fujiwara, Tokyokawa-mura, Japan, assignor to TDK Electronics Co., Ltd., Tokyo, Japan
Continuation-in-part of application Ser. No. 366,732, May 12, 1964. This application Nov. 6, 1967, Ser. No. 680,900
Claims priority, application Japan, May 18, 1963, 38/26,017
Int. Cl. C04b *35/00, 35/46;* H01b *3/12*
U.S. Cl. 106—39                                    7 Claims

ABSTRACT OF THE DISCLOSURE

Ceramic dielectric materials are provided. Such materials demonstrate high dielectric constants and small temperature coefficients of dielectric constants. The dielectric materials are prepared by sintering at a temperature of about 1350° C. a mixture having the following composition:

Figure 1:
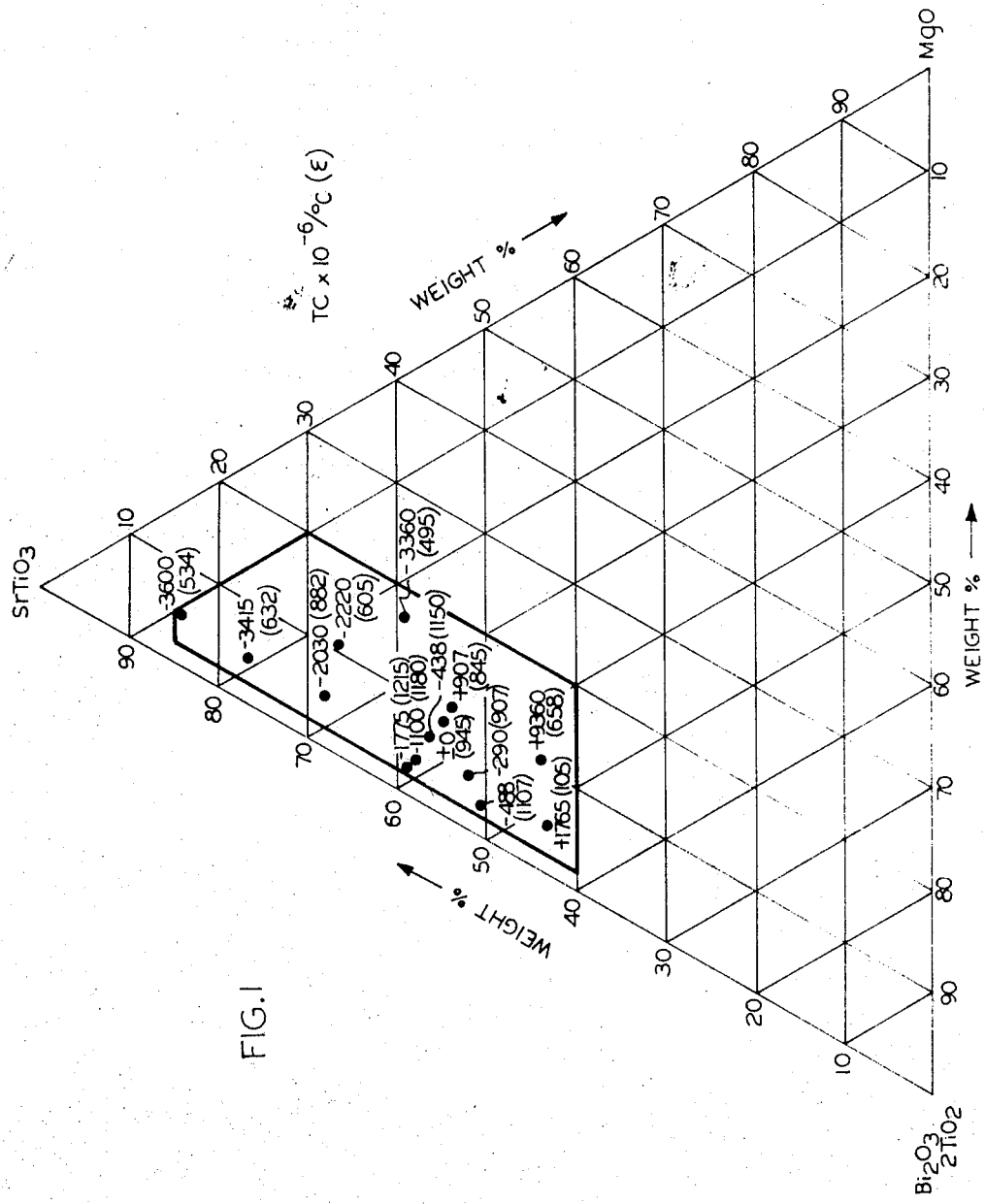

| Component: | Percent by weight |
|---|---|
| $SrTiO_3$ | 40–80 |
| $Bi_2O_3 \cdot 2TiO_2$ | 10–55 |
| $MgCO_3$ | 5–35 |

---

This application is a continuation-in-part application of copending application, Ser. No. 366,732 filed May 12, 1964, now abandoned.

The present invention relates to improvements in certain of the properties of ceramic dielectrics.

The object of the present invention is to provide ceramic dielectrics which show high dielectric constants and small temperature coefficients of dielectric constants. Therefore, by using the dielectric materials of the present invention, small sized capacitors with good temperature characteristics and very small strain inductances can be obtained.

As is well known, ceramics of barium titanate ($BaTiO_3$) are most widely used for practical purposes. But the applications of a dielectric material of this kind are extremely limited because of the very sharp change of dielectric constant at the Curie point which lies around 120° C. Attempts have been made to smooth out the temperature dependence of the dielectric constant. The addition of calcium titanate ($CaTiO_3$) or magnesium titanate ($MgTiO_3$) smooths out the steep curve depending upon temperature to some extent, but at the same time it involves the lowering of the dielectric constant, which also limits the applicability for practical purposes greatly.

The present invention provides ceramic dielectric with improved properties i.e. ceramic dielectrics which show small temperature coefficients and good temperature characteristics and at the same time high dielectric constants.

A dielectric material of the present invention is produced by sintering at a temperature of about 1350° C., a mixture having the following composition:

| Component: | Percent by weight |
|---|---|
| $SrTiO_3$ | 40–80 |
| $Bi_2O_3 \cdot 2TiO_2$ | 10–55 |
| $MgCO_3$ | 5–35 |
| $MnSO_4$ (as a mineralizer) | 0.005–1 |

The above indicated proportions are the optimum proportions for compositions of the present invention.

The reasons for limiting the composition to the said proportions are as follows:

When the proportion of strontium titanate ($SrTiO_3$) is over 80% by weight, the value of temperature coefficient of the dielectric constant becomes too large in negative sign and the temperature for sintering is required to be higher than 1380° C., and when it is under 40% by weight, the dielectric constant becomes low and at the same time vitrification becomes difficult and the bodies obtained lose dense structure. When $Bi_2O_3 \cdot 2TiO_2$ exceeds 55% by weight, the bodies obtained lose dense structure, and when it is under 10%, the temperature for sintering is required to be higher than 1380° C. When the proportion of magnesium carbonate ($MgCO_3$) exceeds 35% by weight, a high degree of shrinkage takes place, the dielectric constant becomes too low, the temperature for sintering is required to be higher than 1400° C. and vitrification becomes difficult, and when it is under 5% by weight, the temperature coefficient of the dielectric constant takes a high value in negative sign, and so is unsuitable for practical purposes. When the amount of manganese sulfate ($MnSO_4$) is over 1% by weight, the obtained bodies become highly porous and when it is under 0.005% dielectric loss becomes large.

FIG. 1 is a ternary diagram which shows the relation between dielectric constant or the temperature coefficient of dielectric constant and the proportions of the three components of the products in accordance with the present invention, i.e. strontium titanate ($SrTiO_3$), mixture of bismuth oxide and titanium oxide ($Bi_2O_3 \cdot 2TiO_2$) and magnesium carbonate oxide (MgO).

A dielectric material of the present invention is obtained by the following procedure:

After the addition of a suitable mineralizer e.g. manganese sulfate ($MnSO_4$), strontium titanate ($SrTiO_3$) is presintered followed by powdering, then it is mixed with mixture of bismuth oxide and titanium oxide.

$$(Bi_2O_3 \cdot 2TiO_2)$$

and magnesium carbonate ($MgCO_3$) and after shaping, the mixture is sintered at 1250° C. to 1350° C. in air for 2 to 3 hours.

The sintering temperature and hours of these materials may be varied, deepndent upon the composition. It should not be above the sublimation temperature.

Some examples of the present invention are given below.

EXAMPLE 1

Manganese sulfate ($MnSO_4$) is added to strontium titanate ($SrTiO_3$) in the proportion of 0.3%, and this material is pre-sintered at 1320° C., then powdered and mixed with $Bi_2O_3 \cdot 2TiO_2$ and magnesium carbonate ($MgCO_3$) in the weight proportion of $$(SrTiO_3):(Bi_2O_3 \cdot 2TiO_2):(MgCO_3)=57:36:7$$

and after shaping, the mixture is sintered at 1350° C. The ceramic dielectrics thus obtained show the following properties:

Dielectric constant _____ 1180
Temperature coefficient of dielectric constant _____ $-1100 \times 10^{-6}$/° C.

The properties were measured at 1 mc./s. in this example and also in the following herein.

EXAMPLE 2

After adding 0.3% of manganese sulfate ($MnSO_4$), strontium titanate ($SrTiO_3$) is pre-sintered at 1320° C. followed by powdering, then it is mixed with $Bi_2O_3 \cdot 2TiO_2$ and magnesium carbonate ($MgCO_3$) in the weight proportion of $SrTiO_3:Bi_2O_3 \cdot 2TiO_2:MgCO_3=51:32:17$, and the mixture is shaped and sintered at 1350° C. The properties of the resultant products are as follows:

Dielectric constant _____ 945
Temperature coefficient of dielectric constant _____ ±0

As shown in this example, when the proportion of strontium titanate ($SrTiO_3$) is about 50% by weight, the bodies obtained show excellent properties. The temperature coefficient of dielectric constant is ±0 and at the same time, the dielectric constant itself is high enough.

What is claimed is:

1. A ceramic dielectric material sintered from a batch which consists essentially of 40 to 80% by weight of $SrTiO_3$, 10 to 55% of $Bi_2O_3 \cdot 2TiO_2$ and 5 to 35% of $MgCO_3$, wherein a small amount of $MnSO_4$ is added as a mineralizer to $SrTiO_3$.

2. A ceramic dielectric material sintered from a batch which consists essentially of 57% by weight of $SrTiO_3$, 36% of $Bi_2O_3 \cdot 2TiO_2$ and 7% of $MgCO_3$, wherein a small amount of $MnSO_4$ is added as a mineralizer to $SrTiO_3$.

3. A ceramic dielectric material sintered from a batch which consists essentially of 51% by weight of $SrTiO_3$, 32% of $Bi_2O_3 \cdot 2TiO_3$ and 17% of $MgCO_3$, wherein a small amount of $MnSO_4$ is added as a mineralizer to $SrTiO_3$.

4. A ceramic dielectric material as claimed in claim 1, wherein 0.005 to 1% by weight of $MnSO_4$ is added as a mineralizer to $SrTiO_3$.

5. A ceramic dielectric material as claimed in claim 2, wherein 0.005 to 1% by weight of $MnSO_4$ is added as a mineralizer to $SrTiO_3$.

6. A ceramic dielectric material as claimed in claim 3, wherein 0.005 to 1% by weight of $MnSO_4$ is added as a mineralizer to $SrTiO_3$.

7. A method for the preparation of a ceramic dielectric material which comprises:
   (1) pre-sintering a mixture of $SrTiO_3$ with up to 1% by weight $MnSO_4$ at a temperature of about 1320° C. and powdering the resultant pre-sintered material;
   (2) admixing from 40 to 80% by weight of the powdered pre-sintered material with 10 to 55% by weight of $Bi_2O_3 \cdot 2TiO_2$ and 5 to 35% by weight $MgCO_3$;
   (3) forming the mixture to a desired shape; and
   (4) sintering the shaped article at a temperature of about 1350° C.

References Cited

UNITED STATES PATENTS

| | | | |
|---|---|---|---|
| 2,469,584 | 5/1949 | Wainer | 106—39 |
| 3,179,525 | 4/1965 | Welsby et al. | 106—39 |

OTHER REFERENCES

Marzullo et al.: "Note on Dielectric Properties of Magnesium Strontium Titanates," J. Am. Cer. Soc., vol. 40, August 1957, pp. 285–6.

HELEN M. McCARTHY, Primary Examiner

U.S. Cl. X.R.

317—258